United States Patent [19]
Pinard

[11] Patent Number: 5,898,432
[45] Date of Patent: Apr. 27, 1999

[54] ANIMATED CURSOR

[75] Inventor: Deborah L. Pinard, Kanata, Canada

[73] Assignee: Mitel Corporation, Kanata, Canada

[21] Appl. No.: 08/815,858

[22] Filed: Mar. 12, 1997

[51] Int. Cl.[6] .................................................. G06F 3/00
[52] U.S. Cl. ............................................ 345/334; 345/145
[58] Field of Search ................................... 345/333, 334, 345/339, 145, 156–160

[56] References Cited

U.S. PATENT DOCUMENTS

| | | | |
|---|---|---|---|
| 5,331,111 | 7/1994 | O'Connell | 84/602 |
| 5,423,039 | 6/1995 | Matteson | 395/677 |
| 5,447,164 | 9/1995 | Shaya et al. | 600/523 |
| 5,452,416 | 9/1995 | Hilton et al. | 345/334 X |
| 5,717,879 | 2/1998 | Moran et al. | 345/339 |

OTHER PUBLICATIONS

Coffee, p. "Objects' layout eases program construction," PC Week, V10, N43, p. 120(1), 1993.
Backman, R.C., "The MAcintosh Cursor," Nibble, V5, N10, pp. 56–63, 1984.
James, M., "Fix in Time," CAdCam, V12, N4, p. 71(3), 1993.

*Primary Examiner*—A. Katbab
*Attorney, Agent, or Firm*—Pascal & Associates

[57] ABSTRACT

A method of indicating to a user of a terminal which includes a display, of the occurrence of a function which can be implemented on the terminal, comprising displaying a cursor on the display which cursor is moveable by the user and which has a form and position on the display which is related to a program currently being used by the user and which is unrelated to the function, and changing the form of the moveable cursor at the position to one which relates to the function upon occurrence of the function.

10 Claims, 4 Drawing Sheets

ANIMATED CURSOR

FIELD OF THE INVENTION

This invention relates to the field of processor controlled systems, and in particular to a method of displaying a cursor to a user on the display of a terminal such as a computer terminal.

BACKGROUND TO THE INVENTION

One of the common functions of a graphical user interface (GUI) used in a computer (PC) is to display a cursor, which is typically in the form of an arrow icon, although other icons can be displayed as the cursor. The position of the cursor on the display is controlled by the user, by using keys on keyboard, in conjunction with a user program being run on the PC. The form and position of the cursor on the display is provided by the GUI, under commands supplied from the user program.

Thus for example, a cursor can be in the form of an arrow when positioned on the alphanumeric entry portion of the display, but can be controlled to change to a different form when it is positioned by the user to be over a command icon located in a ribbon at an edge of the alphanumeric entry portion of the display.

It is important to recognize that the user positions the cursor at a location where the user's attention is focused. Intensity of the focusing of the user's attention is often so strong at the cursor position that the user can miss the change in an icon or the introduction of a new icon on the display caused by another function which is not under immediate control by the user, such as a program operating in background.

For example, it is common that computer terminals are used to receive fax messages, announcements of the receipt of electronic mail (E-mail) or announcements of incoming telephone calls. These functions are typically performed in background to the program being run, and cause display of an icon corresponding to the function, e.g. an icon illustrating a piece of paper in the case of receipt of a fax, an envelope in the case of a E-mail message waiting to be read, and a flashing telephone set in the case of an incoming telephone call. These icons are typically placed by the operating system in a fixed location in foreground, along an edge or adjacent a corner of the PC display, in a ribbon, etc. Due to the intensity of concentration by the PC user at the location of the cursor, these fixed icons are often overlooked, destroying the timeliness of access to the associated function.

SUMMARY OF THE INVENTION

In accordance with an embodiment of the invention, the cursor itself changes to an icon or to include an icon related to the function. Since the icon related to the function is at the focus of attention of the user, it is virtually impossible to ignore or be overlooked by the user.

In accordance with an embodiment of the invention, a method of displaying a cursor to a user of a terminal is comprised of displaying a cursor to a user, the location of the cursor being moveable by the user, and automatically changing the form of the cursor upon occurrence of an event which requires attention by the user.

For example, the form of the cursor can be changed upon receipt by the terminal of a signal indicating at least one of ringing of a telephone, an E-mail message waiting to be read, the receipt of a fax, and an alarm.

In accordance with another embodiment, a method of indicating to a user of a terminal which includes a display, of the occurrence of a function which can be implemented on the terminal, is comprised of displaying a cursor on the display which cursor is moveable by the user and which has a form and position on the display which is related to a program currently being used by the user, and changing the form of the moveable cursor at said position to one which relates to said function upon occurrence of the function.

BRIEF INTRODUCTION TO THE DRAWINGS

A better understanding of the invention will be obtained by considering the detailed description below, with reference to the following drawings, in which:

FIG. 1 is a block diagram of a system in which the invention can be implemented, FIG. 2 is a diagram of a terminal and a telephone on the desktop of a user, illustrating a normal icon on the display of the terminal, prior to the receipt of a function message, FIGS. 3–5 are diagram of a terminal and a telephone on the desktop of a user, illustrating changed icons on the display of the terminal, following receipt of function messages, FIG. 6 is a diagram illustrating the relationship of various programs in accordance with an embodiment of the invention, and FIG. 7 is a diagram illustrating the relationship of agents in the operation of the invention in accordance with another embodiment.

DETAILED DESCRIPTION OF EMBODIMENTS OF THE INVENTION

Figure 1:
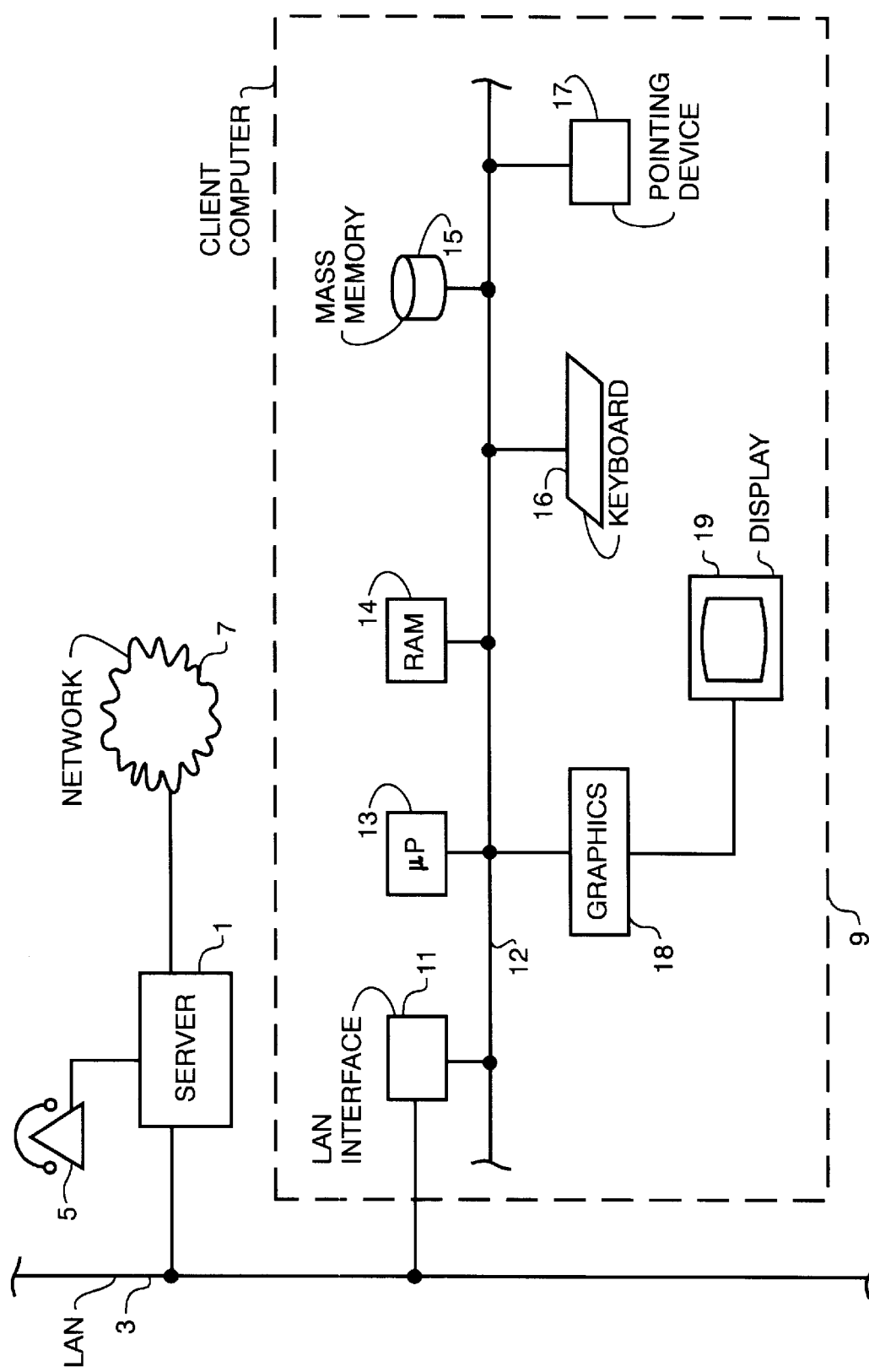

FIG. 1 illustrates a system with which the present invention can be implemented. This system is described in Canadian patent application publication 2,148,970 published May 15, 1996, and can alternatively be implemented using the structures described in Canadian patent application publication 2,119,085 published Sep. 16, 1995. It is assumed that the reader is familiar with the content of these publications, and therefore to avoid redundancy a detailed description of these structures will not be repeated. However, for the purpose of completion, a brief description of the system described in Canadian patent application publication 2,148,970 will be given. It should also be noted that persons skilled in the art can implement the present invention on other appropriate systems.

A telephony server 1 is connected to a local area network (LAN) 3. Plural telephones represented by telephone 5 is connected to the server. The server is connected to a network, such as a public switched communication network 7.

One or plural client computers, represented by client computer (terminal) 9 such as a personal computer (PC) is connected to the LAN. The PC is typically comprised of a LAN interface 11 which is connected to an expansion bus 12, a microprocessor 13, a random access memory (RAM) 14, mass memory 15 such as a hard disk drive, a keyboard 16, a pointing device 17 (e.g. a mouse, a track ball, etc.), and a graphics circuit 18 all connected to the bus 12, among other circuits which are not shown. A display 19 is connected to the graphics circuit, and is driven by the graphics circuit.

The computer 9 stores and operates various programs, such as word processors, spread sheets, etc., typically under graphical user interface (GUI) program such as Windows, which is made by Microsoft Corporation.

Server 1 stores and operates various programs as described in the first-noted patent application above, such as controlling communication channels between telephone sets 5, between network 7 and telephone sets 5, E-mail, etc. Telephone sets 5 are typically used in association with corresponding PCs 9, and programs stored by server 1 will control the interchange of E-mail and faxes sent between PCs 9 and/or between PCs 9 and the network, etc. Telephone application programs stored in server 1 or in PCs 9 control display of a telephone GUI which aids the user in making or receiving telephone calls, initiating and using special telephone-related services, etc.

Thus for example, a user can operate an E-mail GUI on his PC 9, create E-mail messages, transmit them to other PCs connected to LAN 3, which messages will be stored by server 1. The server then sends an E-mail message received message to the PC of the designated recipient, the latter PC then displaying an appropriate icon on its display at a predetermined location.

One of the common functions of a GUI is to display a cursor, which is typically in the form of an arrow icon, although other icons can be displayed as the cursor. The position of the cursor on the display is controlled by the user, by using keys on keyboard, in conjunction with a user program being run on the PC. The form and position of the cursor on the display is provided by the GUI, under commands supplied from the user program.

Thus for example, a cursor can be in the form of an arrow when positioned on the alphanumeric entry portion of the display, but can be controlled to change to a different form when it is positioned by the user to be over a command icon located in a ribbon at an edge of the alphanumeric entry portion of the display.

It is important to recognize that the user positions the cursor at a location where the user's attention is focused. Intensity of the focusing of the attention is often so strong at the cursor position that the user can miss the change in an icon or the introduction of a new icon on the display caused by another function which is not under immediate control by the user.

For example, it is common that external stimuli, such as incoming fax messages, e-mail, or telephone calls, are received by computer terminals. The functions associated with these external stimuli, such as receiving the fax message, receiving an incoming e-mail, or announcing an incoming telephone call, are typically performed in the background to the program being run, and cause display of an icon corresponding to the function, e.g. an icon illustrating a piece of paper in the case of a fax, a lightning bolt in the case of an E-mail, and a flashing telephone set in the case of an incoming telephone call. These icons are often placed by the operating system in foreground, along an edge or adjacent a corner of the screen, in a ribbon, etc. Due to the intensity of concentration by the PC user at the location of the cursor, these icons are often overlooked, destroying the timeliness of access to the associated function.

In accordance with an embodiment of the invention, the cursor itself changes to an icon or to include an icon related to the function. Since the icon related to the function is at the focus of attention of the user, it is virtually impossible to ignore or be overlooked by the user.

Figure 2:
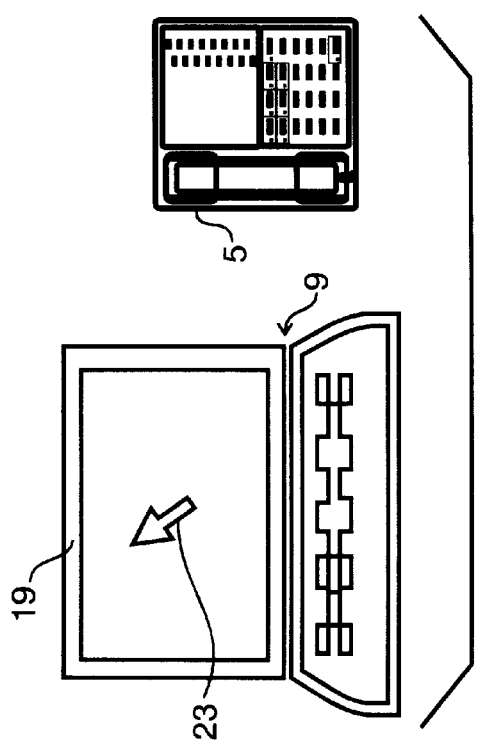

FIGS. 2, 3, 4 and 5 illustrate the above. In FIG. 2, a PC 9 is shown, with an adjacent telephone set 5, located on the desktop of the user. An arrow icon 23 is displayed as the cursor on display 19, its location being controlled on the display by the user during operation of the program on the PC 9, which is the focus of the user's attention.

Now a telephone call is received, which rings telephone set 5. The ringer may have been turned off, or there could be noise or deep attention to the program being run on the PC which causes the user to overlook the telephone call.

Figure 3:
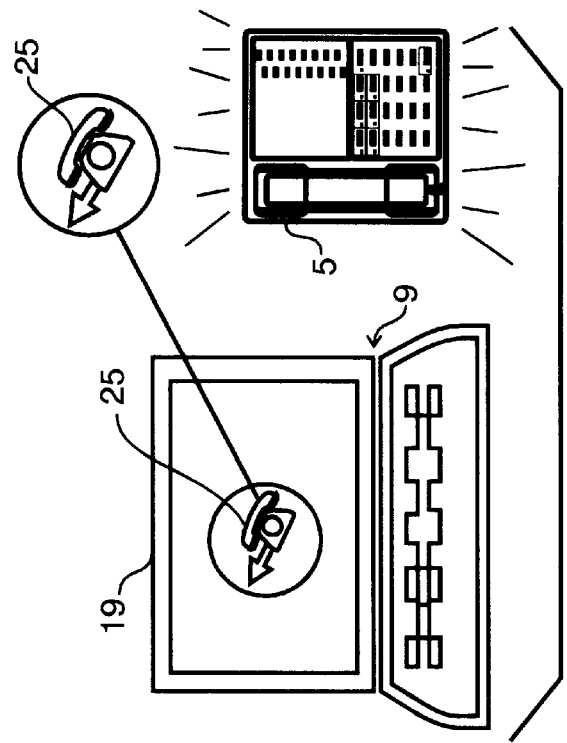

In accordance with an embodiment of the present invention, as shown in FIG. 3 the cursor changes to a cursor 25 which includes a telephone set (which could be made to flash to designate ringing). Since the attention of the user is right at the cursor, the presence of the incoming call is virtually impossible to overlook.

Figure 5:
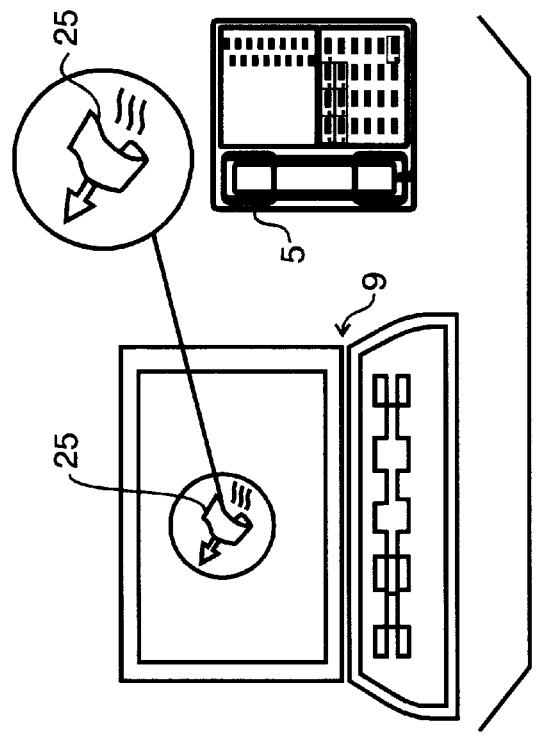
Figure 4:
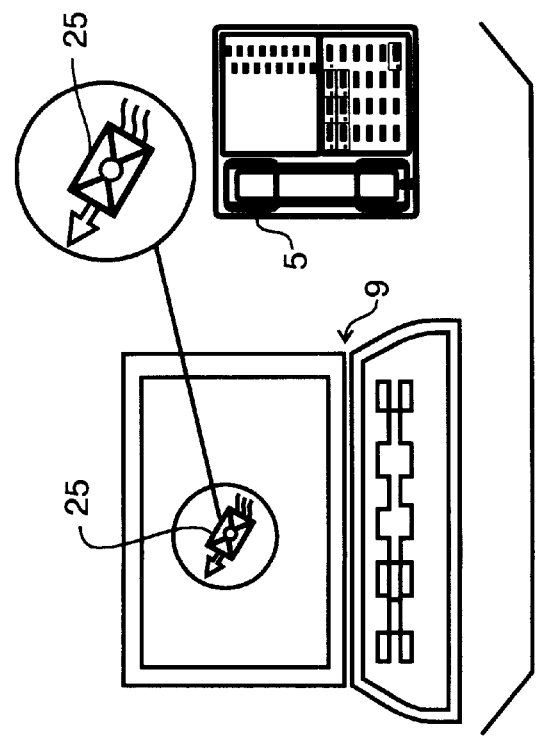

FIG. 4 illustrates the cursor having been changed to cursor 25 having a form that indicates that an E-mail message is waiting, and FIG. 5 illustrates the cursor having been changed to cursor 25 that indicates that a fax message is being or has been received.

FIG. 5 illustrates the software program relationships to effect the above-described embodiment. An application program 27 (shown as New Cursor Application) receives messages from E-mail application 29, telephone application 31, etc., when new incoming communication occurs. The E-mail, telephone, etc. applications are stored in server 1, and transmits signals to the designated PC in the usual manner. Normally upon receiving these signals the PC will display an appropriate icon in a fixed location in a corner or along an edge of the PC display, by commanding the GUI to send signals to graphics circuit 18.

To implement the present invention, however, the new cursor application 27 accesses the cursor driver 33 in the GUI, and causes it to change the form of the cursor that is displayed to one appropriate to the incoming function.

The changed cursor can be displayed for a predetermined period of time, after which it can change to its normal form for the program in process, and/or a fixed icon displayed adjacent an edge or corner of the display. In that case the new cursor application should contain a timer which is started when the cursor driver is caused to change the form of the cursor that is displayed, and after time-out causes the new application program to control the cursor driver to display the original cursor.

Alternatively the cursor can be caused to be changed to its original form by the user closing a switch, such as a key on keyboard 16, a switch on a mouse, etc., which is detected by the GUI, and this control signal is sent to the new cursor application, which causes the cursor driver in response to display the original cursor.

Alternatively the cursor can be caused to change to its original form by action by the user, such as by the user answering the telephone, running an application program to access the E-mail or read or print a received fax, etc. In this case the application program in sensing this action by the user, sends a control message to the new cursor application, which causes the cursor driver in response to display the original cursor.

Of course any of the above can be used in combination.

As well, a mouse could be used to automatically answer a call or read the mail while it is in the "changed" state.

Cursor control and its graphical form and location are known to persons skilled in the art, and are described for example, for the GUI Windows 3.1, in the text "Programming Windows 3.1", by Charles Petzold, copyright 1992, pages 313–324. For the GUI Windows NT, Windows 3.51, Windows 4.0 and Windows 95, the same is described in Microsoft Developer Network CD ROM, Windows-Microsoft Development Library, part number 69145, and in particular the chapters related to the commands GetCursor (which retrieves the handle of the current cursor, LoadCursorFromFile (which creates a cursor shape based on data contained in a file, specified by name or by a system cursor identifier), LoadCursor (which loads a specified cursor resource from an executable file associated with an application instance), and SetCursor (which establishes the cursor shape).

Pseudo code that can be used for the implementation of the above-described new application program in the PC, follows. In actual code resulting from this pseudocode, where it is required to send a new type of cursor to the cursor driver, the actual code would use the LoadCursorFromFile followed by the SetCursor function calls to a Windows GUI as outlined in the publications noted above.

```
WHILE waiting for a message DO
    IF message received THEN
        get current cursor type
            CASE state OF
                idle
                    CASE msg OF
                        new call
                            change to ringing state
                            send ringing cursor to
                                cursor driver
                    ENDCASE
                ringing
                    CASE msg OF
                        answer
                            change to idle state
                            send normal cursor to
                                cursor driver
                        new mail
                            change to ringing & new
                                mail state
                            send ringing & new mail
                                cursor to cursor
                                driver
                    ENDCASE
                new mail
                    CASE msg of
                        mail read
                            change to idle state
                            send normal cursor to
                                cursor driver
                        new mail
                            change to ringing & new
                                mail state
                            send ringing & new mail
                                cursor to cursor
                                driver
                    ENDCASE
                ringing & new mail
                    CASE msg OF
                        mail read
                            change to ringing state
                            send ringing cursor to
                                cursor driver
                        answer
                            change to new mail state
                            send new mail cursor to
                                cursor driver
                    ENDCASE
            ENDCASE
    ENDIF
ENDWHILE
```

Figure 7:
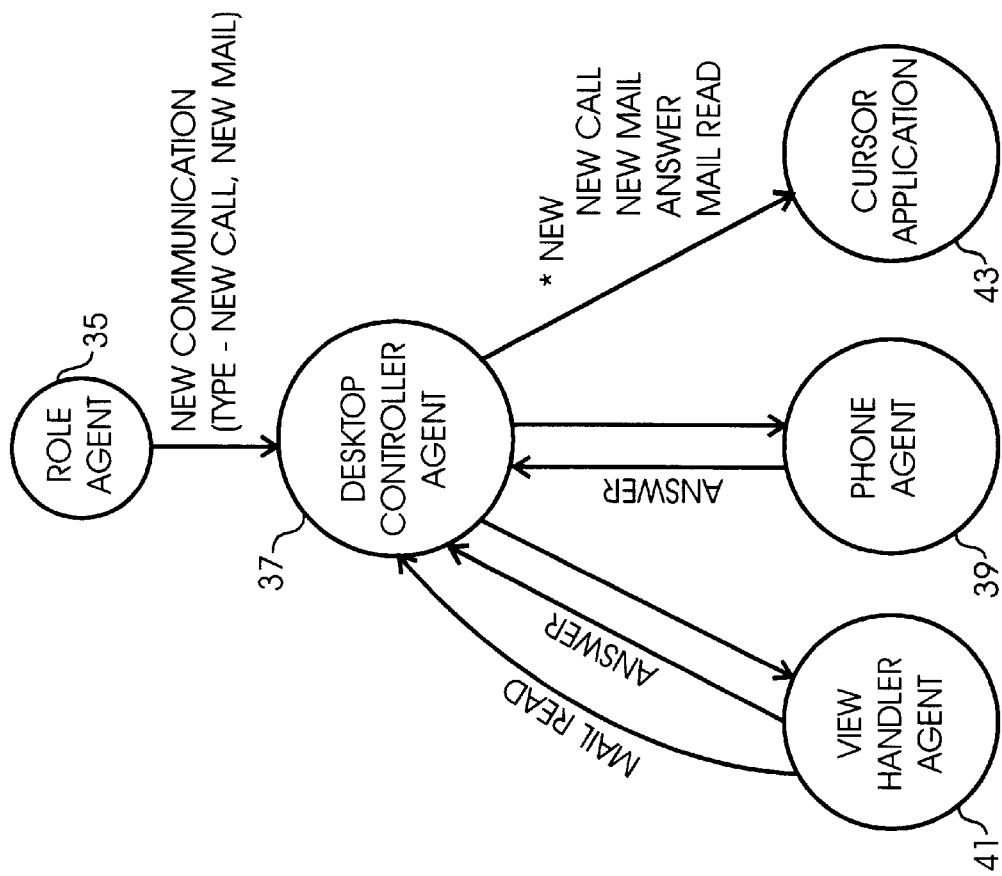
Figure 6:
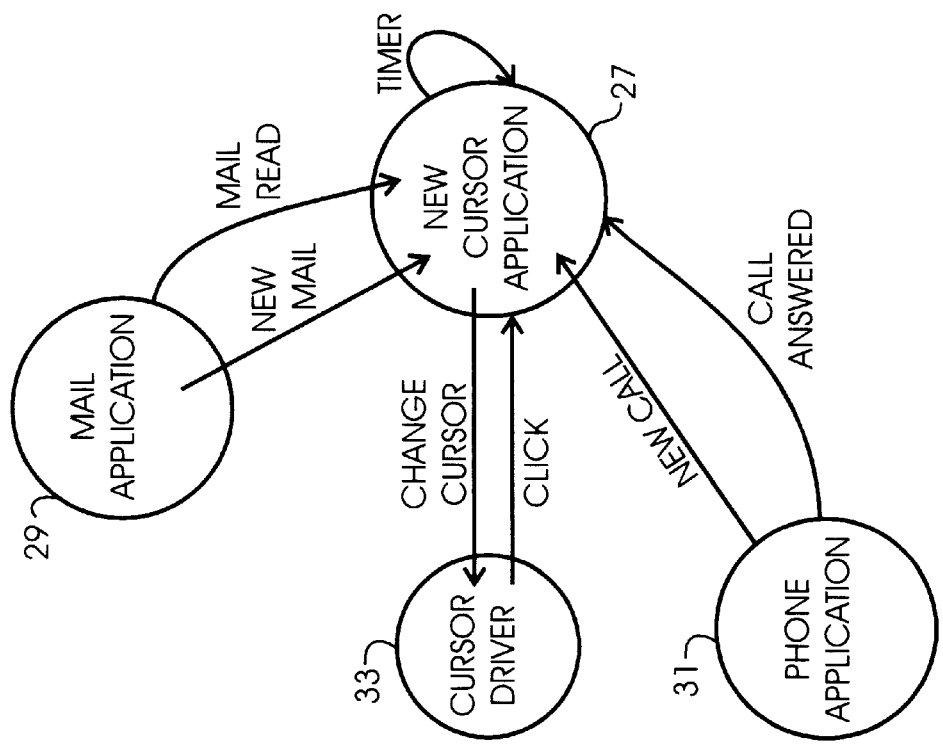

If the system operates using software agents as described in patent application publication 2,119,085, the agent which receives communications should send messages (e.g. new mail, new telephone call, read mail, answer) to the new cursor application. This is illustrated in FIG. 7, wherein the communication role agent 35 sends the aforenoted messages to a desktop controller agent 37. The desktop controller agent then interacts with the various agents such as the telephone agent 39, the E-mail or fax handler agent 41, to advise it of the presence of the function. It also interacts with the cursor application resource agent 43 (which controls the shape and location of the cursor) to advise it of a new telephone call, new E-mail, a fax being or having been received, etc., which causes the aforenoted change in the form of the cursor.

When the telephone or view handler agent senses that a call has been answered, E-mail or a fax read, etc., it advises the desktop controller agent of this, which sends a message to the cursor application resource agent to change the cursor shape back to its original form. The desktop controller agent can have a timer associated with the cursor form change resulting from the messages from the telephone agent or view handler agent, or implement reversion to the original form of cursor in the instances described earlier.

It should be noted that instead of changing the cursor, the displayed caret (insertion point indicator), or the caret and the cursor can be changed. The term cursor should thus be construed in the context of this specification including the claims to mean either the cursor, the caret, or both cursor and caret.

A person understanding this invention may now conceive of alternative structures and embodiments or variations of the above. All those which fall within the scope of the claims appended hereto are considered to be part of the present invention.

I claim:

1. A method of indicating to a user of a terminal which includes a display, of the occurrence of an external stimulus unrelated to operation of a current user program by a terminal user, allowing operation of a function associated with said external stimulus which can be implemented on the terminal, comprising displaying a cursor on the display which cursor is moveable by the user and which has a form and position on the display which is related to said user program currently being used by the user and which is unrelated to the function, and changing the form of the movable cursor at said position to one which relates to said function upon occurrence of the external stimulus.

2. A method as defined in claim 1 in which said external stimulus is comprised of the reception by the terminal of an E-mail message waiting indication signal, and in which the form of the cursor changes to include an E-mail message waiting graphic.

3. A method as defined in claim 1 in which said external stimulus is comprised of the reception by the terminal of a fax receipt indication signal, in which the form of the cursor changes to include a fax waiting graphic.

4. A method as defined in claim 1 in which said external stimulus is comprised of the reception by the terminal of a telephone call reception indication signal, and in which the form of the cursor changes to include a telephone call waiting graphic.

5. A method as defined in claim 1, including changing the form of the cursor back to one related to said program upon at least one of time-out, the closing of a keyboard or other user control device switch, response to the external stimulus by the user, or completion by the user, by the terminal or by a system, of one or more actions related to the function.

6. A method of displaying a cursor to a user of a terminal, comprising displaying a cursor to a user, the location of the cursor being moveable by the user, and automatically changing the form of the cursor at said location upon occurrence of an external event which requires attention by the user.

7. A method as defined in claim 6 in which the occurrence of the external event is comprised of receipt by the terminal of a signal which is generated upon occurrence of the event.

8. A method as defined in claim 7 in which the external event is receipt by the terminal of a signal indicating at least one of ringing of a telephone, an E-mail or voice mail message waiting to be read, the receipt of a fax, the receipt of a video call, the presence of a shared workspace, and the receipt of an alarm.

9. A method as defined in claim 7 in which the external event is the receipt of an incoming communication signal.

10. A method as defined in claim 9 including closing a switch or virtual switch on or by means of a mouse of other pointing device to respond to the incoming communication signal while the cursor is in its changed form.

* * * * *